(12) United States Patent
Akira

(10) Patent No.: US 7,167,770 B1
(45) Date of Patent: Jan. 23, 2007

(54) METHOD OF CORRECTING TRANSFER OF A THIN MATERIAL AND A THIN MATERIAL TRANSFER APPARATUS

(75) Inventor: Toshiro Akira, Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 1637 days.

(21) Appl. No.: 09/159,968

(22) Filed: Sep. 24, 1998

(30) Foreign Application Priority Data

Sep. 26, 1997 (JP) .............................................. 9-262531

(51) Int. Cl.
*G06F 19/00* (2006.01)
*G06F 7/66* (2006.01)

(52) U.S. Cl. ...................... 700/122; 700/114; 700/117; 700/127; 700/128

(58) Field of Classification Search ................. 700/193, 700/304, 114, 124, 127–128, 117, 122; 271/263, 271/121; 382/181; 347/116; 355/40, 41
See application file for complete search history.

(56) References Cited

U.S. PATENT DOCUMENTS

| | | | | |
|---|---|---|---|---|
| 4,939,539 A | | 7/1990 | Shigaki | |
| 5,093,674 A | * | 3/1992 | Storlie | 347/116 |
| 5,291,225 A | * | 3/1994 | Saito | 346/134 |
| 5,437,445 A | * | 8/1995 | Chang | 271/263 |
| 5,555,181 A | * | 9/1996 | Seto | 355/41 |
| 5,626,334 A | * | 5/1997 | Kondo | 271/121 |
| 5,774,357 A | * | 6/1998 | Hoffberg | 713/600 |
| 5,790,921 A | * | 8/1998 | Ishikura | 399/86 |
| 5,801,814 A | * | 9/1998 | Matsumoto | 355/40 |
| 5,875,108 A | * | 2/1999 | Hoffberg | 700/17 |
| 5,920,477 A | * | 7/1999 | Hoffberg | 382/181 |

FOREIGN PATENT DOCUMENTS

EP            1324514         7/1973

* cited by examiner

*Primary Examiner*—Anthony Knight
*Assistant Examiner*—Ronald D Hartman, Jr.
(74) *Attorney, Agent, or Firm*—Jordan and Hamburg LLP

(57) ABSTRACT

A transfer correcting method for a thin material transfer apparatus includes detecting a front end of a thin material by the sensor, and transferring the thin material from a position of the sensor, to a processing unit, and further a reference transfer range from the processing unit to produce a first processed thin material portion, and transferring the thin material the reference transfer range to produce a second processed thin material portion, calculating a first correction value based on the reference transfer range and a measured length of the second processed thin material portion and a second correction value based on measured lengths of the first and second processed thin material portions, and correcting the transfer from the sensor position to the processing unit position, and the transfer from the processing unit position based on based on the first and second correction values.

8 Claims, 4 Drawing Sheets

METHOD OF CORRECTING TRANSFER OF A THIN MATERIAL AND A THIN MATERIAL TRANSFER APPARATUS

BACKGROUND OF THE INVENTION

This invention relates to a method of correcting transfer of a thin material such as printing paper in a thin material transfer apparatus which is applied to a photoprinting machine or the like, and also to a thin material transfer apparatus to which the correction method is applied.

Recently, a photoprinting machine which automatically prints a film image or the like on printing paper is widely used. Such a photoprinting machine has a thin material transfer apparatus comprising: a transfer roller which transfers printing paper; a sensor which detects the front end of the transferred thin material; and a cutter which is disposed downstream from the sensor. Roll-like printing paper which is drawn out from a magazine or the like is transferred to a cut position by the transfer roller, and then cut into a predetermined length. The cut printing paper is transferred to a print position, and then subjected to a printing process. The transfer roller is rotated by a DC motor or the like so as to transfer printing paper by a predetermined range in accordance with the number of transfer pulses supplied to the motor.

In such a photoprinting machine, the transfer range of printing paper is varied by a change of the diameter of the transfer roller which is caused by reasons such as wear of the roller or replacement of the roller. Even when the transfer roller is rotated by a specified transfer pulse number, therefore, an error occurs in the distance of the cut printing paper. When the sensor for detecting the front end of printing paper or the cutter for cutting printing paper is replaced with another one, the mounting position may be varied so as to change the mounting distance between the sensor and the cutter. The transfer range of printing paper is varied also by this change, with the result that, even when the transfer roller is rotated by a specified transfer pulse number, an error occurs in the distance of the cut printing paper.

When the transfer roller, the sensor, or the like is replaced with another one, therefore, an error in transfer of printing paper is corrected in the method described below.

First, printing paper is transferred by the transfer roller and the cutter continuously performs two cutting operations on the printing paper, thereby obtaining two cut sheets of printing paper (hereinafter, such a sheet is referred to as a cut sheet). The distance of the second cut sheet is measured and the difference between the measured distance and a reference distance is calculated. The number of transfer pulses required for transferring a predetermined length of the printing paper from the position of the cutter is changed on the basis of the difference to correct the transfer range from the cutter position. The above-mentioned measurement of the distance of the second cut sheet is performed because of the following reason. The first cut sheet has an error in transfer from the cutter position, and also an error in transfer from the sensor position to the cutter position. By contrast, the second cut sheet has only an error in transfer from the cutter position.

Next, the printing paper is rewound so that the front end is located in front of the sensor. Then, the printing paper is again transferred to the downstream side. After the front end of the printing paper reaches the sensor, the printing paper is transferred by a transfer pulse number which corresponds to the mounting distance between the sensor and the cutter and which has not yet been corrected. In succession, the printing paper is further transferred from the cutter position by a transfer pulse number which corresponds to the predetermined range and which has been corrected, and the printing paper is cut by the cutter, thereby obtaining a third cut sheet.

The distance of the third cut sheet is measured and the difference between the measured distance and the reference distance is calculated. The number of transfer pulses required for transferring the printing paper from the sensor position to the cutter position is changed on the basis of the difference to correct the transfer range from the sensor position to the cutter position. In this way, the correction of the transfer range from the sensor position to the cutter position is performed after the transfer range from the cutter position is corrected, because, when the sequence of the corrections is inverted, the measurement is affected by an error in transfer from the cutter position, and hence the correction cannot be satisfactorily performed.

In the above-described method of correcting a transfer error, two cut sheets are required for correcting the transfer range from the cutter position, and one further cut sheet is required for correcting the transfer range from the sensor position to the cutter position. Consequently, many sheets of printing paper are wasted for the correction of the transfer error. When the transfer range from the sensor position to the cutter position is to be corrected, the front end of printing paper must be returned to a position in front of the sensor, and therefore the working efficiency is lowered. When the corrections are performed in a wrong sequence, it is forever impossible to end the correction work.

The problems are produced not only in a process of cutting printing paper, but also in processes of cutting thin materials other than printing paper, i.e., cut sheets made of various kinds of material such as paper, a resin, and a metal. With respect to the contents of a process, furthermore, the problems are produced not only in a cutting process using a cutter, but also in processes performed by various kinds of processing units, for example, formation of perforations in a thin material by a perforating apparatus, or formation of an image by an image forming apparatus. In the case where a process is performed on a wide fixed region, such as that where an image is formed, the edge of the fixed region on the upstream side is called a processing unit.

SUMMARY OF THE INVENTION

It is an object of the present invention to provide a method of correcting transfer of a thin material and a thin material transfer apparatus which have overcome the problems residing in the prior art.

According to an aspect of the invention, a method of correcting transfer of a thin material transfer apparatus comprising a transfer roller which is rotated in accordance with a number of input transfer pulses; a sensor which detects a front end of a thin material transferred by the transfer roller; and a processing unit which is disposed downstream from the sensor, and performs a predetermined process on the transferred thin material, the method comprises the steps of: detecting a front end of a thin material by the sensor, and transferring the thin material from a position of the sensor by a transfer pulse number corresponding to a specified distance between the sensor and the processing unit, and a transfer pulse number corresponding to a reference transfer range from a position of the processing unit; performing the process in the processing unit on the transferred thin material, thereby obtaining a first processed thin material portion; transferring the thin material by a transfer pulse number corresponding to the reference transfer range; performing the process in the processing unit on the transferred thin material, thereby obtaining a second processed thin material portion; calculating a first correction value for correcting a transfer error based on the reference transfer range and a measured length of the second processed thin material portion, and calculating a second correction value for correcting a transfer error based on measured lengths of the first and second processed thin material portions; and correcting the transfer from the sensor position to the processing unit position, and the transfer from the processing unit position based on based on the first and second correction values.

According to another aspect of the invention, a thin material transfer apparatus comprises; a roller driving unit which rotates a transfer roller in accordance with a number of input transfer pulses; a sensor which detects a front end of a thin material transferred by the transfer roller; a processing unit which is disposed downstream from the sensor, and performs a predetermined process on the transferred thin material; a first calculator which calculates a first transfer pulse number for transferring the thin material from a position of the sensor to a position of the processing unit position, the first transfer pulse number being calculated based on first and second correction values for correcting a transfer error, the first correction value being calculated based on a reference transfer range and a measured length of a second processed thin material portion, the second correction value being calculated based on measured lengths of the first and second processed thin materials portion, the reference transfer range being a predetermined range which the thin material is transferred from the position of the processing unit, the first processed thin material portion being produced by transferring the thin material from the position of the sensor by a transfer pulse number corresponding to a specified distance between the sensor and the processing unit after the sensor detects the front end of the thin material, and transferring from the position of the processing unit by a transfer pulse number corresponding to the reference transfer range, performing the process in the processing unit, the second processed thin material portion being produced by transferring the thin material by a transfer pulse number corresponding to the reference transfer range, performing the process in the processing unit on the transferred thin material; a second calculator which calculates a second transfer pulse number for transferring the thin material from the processing unit position based on the first correction value; and a control unit which controls the roller driving unit to transfer the thin material from the sensor position by a sequence of the first transfer pulse number and the second transfer pulse number.

These and other objects, features and advantages of the present invention will become more apparent upon a reading of the following detailed description and accompanying drawings.

DETAILED DESCRIPTION OF PREFERRED EMBODIMENT OF THE INVNETION

Figure 1:
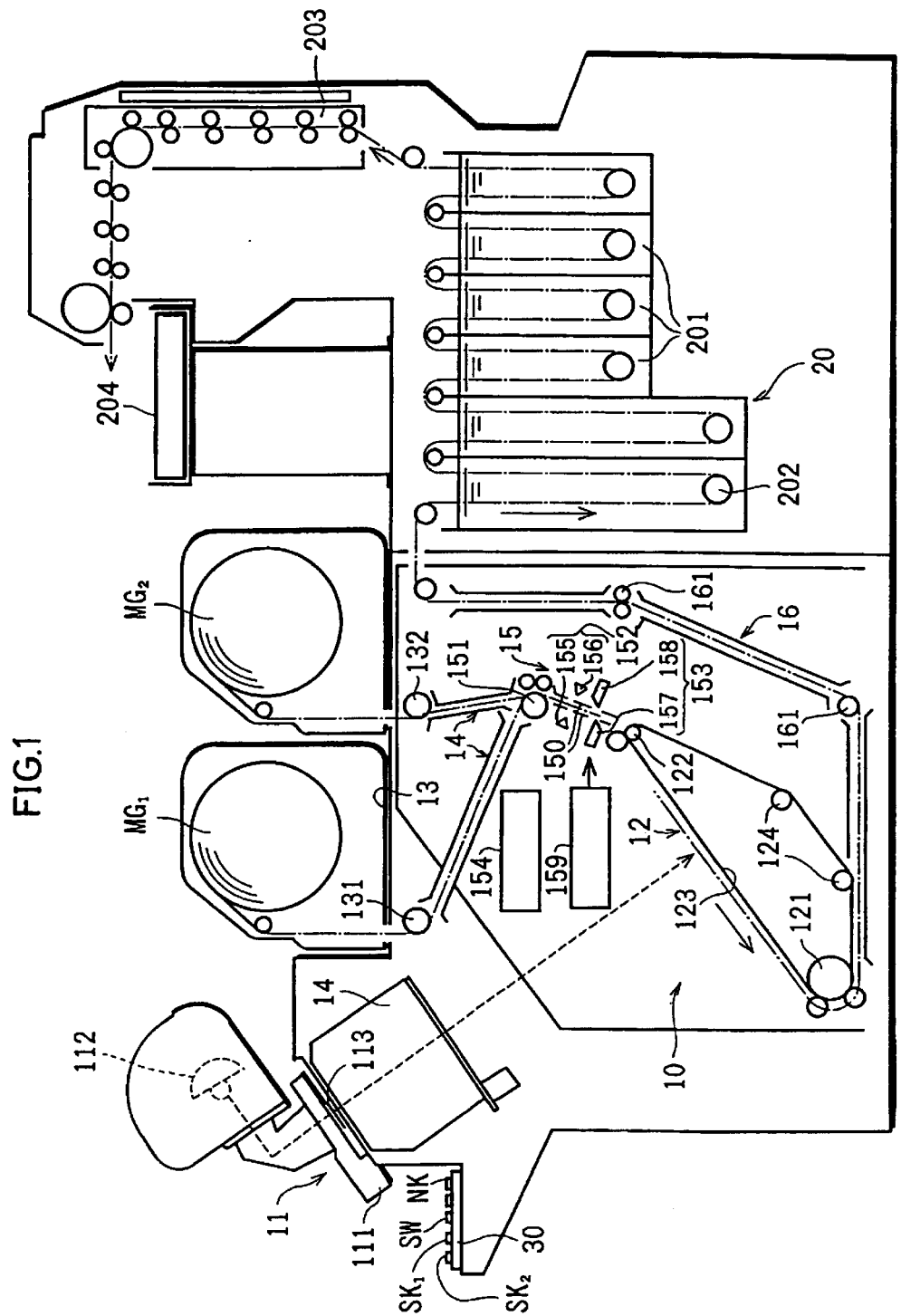
FIG. 1 is a diagram schematically showing a configuration of a photoprinting machine having a thin material transfer apparatus embodying the invention.

FIG. 1 is a diagram schematically showing a configuration of a photoprinting machine having a thin material transfer apparatus embodying the invention. Referring to the figure, the photoprinting machine comprises: a print processing unit 10 which is placed in the left side of the figure; a developing unit 20 which is placed in the right side of the figure; and a control panel 30 which is disposed on the front face of the photoprinting machine in the left side of the figure, and which has a start switch SW, setting keys NK such as a ten-key pad for setting various process conditions, and the like.

The print processing unit 10 comprises: a film image projecting unit 11 which is disposed in the upper left side of the figure; a printing unit 12 which is disposed in a center portion; a printing paper supplying unit 13 on which two magazines respectively incorporating printing papers of different sizes are mounted; a first transfer path 14 which transfers printing paper that is selectively drawn out from one of the first and second magazines $MG_1$ and $MG_2$, to the downstream side; a second transfer path 15 which transfers the printing paper transferred from the first transfer path 14, to the printing unit 12; and a third transfer path 16 which transfers the printing paper that has undergone a printing process in the printing unit 12, to the developing unit 20.

The film image projecting unit 11 comprises: a negative carrier 111 which transfers a developed negative film to an exposure position in the unit of one frame; a light source 112 which is disposed above the negative carrier 111; a shutter 113 which is disposed below the negative carrier 111; and an optical lens system 114 which forms a film image on the face of the printing paper on the printing unit 12.

The printing unit 12 comprises a driving roller 121, a driven roller 122, a transfer belt 123 which is wound around the rollers 121 and 122, and a tension roller 124 which applies given tension to the transfer belt 123.

The printing paper supplying unit 13 is disposed above the printing unit 12, and comprises a first feed roller 131 below the first magazine $MG_1$, and a second feed roller 132 below the second magazine $MG_2$. The first and second feed rollers 131 and 132 are selectively rotated by a roller driving unit which is not shown, so that printing paper drawn out from the first magazine $MG_1$ or the second magazine $MG_2$ is sent out to the second transfer path 15 via the first transfer path 14.

The second transfer path 15 comprises: guide plates 150 which are opposed to each other; a transfer roller 151 which transfers the printing paper transferred from the first transfer path 14, toward the printing unit 12; a sensor 152 which is disposed downstream from the transfer roller 151, and which detects the front end of the printing paper transferred by the transfer roller 151; and a cutter 153 which is disposed downstream from the sensor 152. The transfer roller 151 is rotated by a roller driving unit 154 consisting of a DC motor which rotates in accordance with the number of input transfer pulses, and other components. The sensor 152 consists of a light emitting portion 155 which is disposed on the side of the exposure face of printing paper, and a light receiving portion 156 which is disposed on the opposite side. The cutter 153 consists of an upper blade 157 which is disposed on the side of the exposure face of printing paper, and a lower blade 158 which is disposed on the opposite side. The upper blade 157 is vertically moved by a cutter driving unit 159 which consists of a DC motor and the like, so that roll-like printing paper transferred by the transfer roller 151 is cut into a predetermined length. The transfer roller 151, the sensor 152, the cutter 153, and the like of the second transfer path 15 constitute the thin material transfer apparatus to which the transfer correcting method is applied.

The third transfer path 16 comprises a plurality of transfer rollers 161 which are rotated by a roller driving unit (not shown) so as to transfer the printing paper that has undergone a printing process in the printing unit 12, to the developing unit 20.

The developing unit 20 comprises: a plurality of process tanks 201 filled with processing liquid for performing a developing process on printing paper on which an image is printed in the print processing unit 10; transferor 202 for transferring printing paper in the process tanks 201, a drying chamber 203 in which printing paper discharged from the process tanks 201 is dried; and a printing paper discharging unit 204 which sequentially discharges dried printing paper onto trays (not shown) that are vertically arranged.

The control panel 30 comprises the start switch SW and the setting keys NK, and also first and second input designating keys $SK_1$ and $SK_2$ through which a measured distance of printing paper that is cut by the cutter 153 disposed above the second transfer path 15 is to be input.

Figure 2:
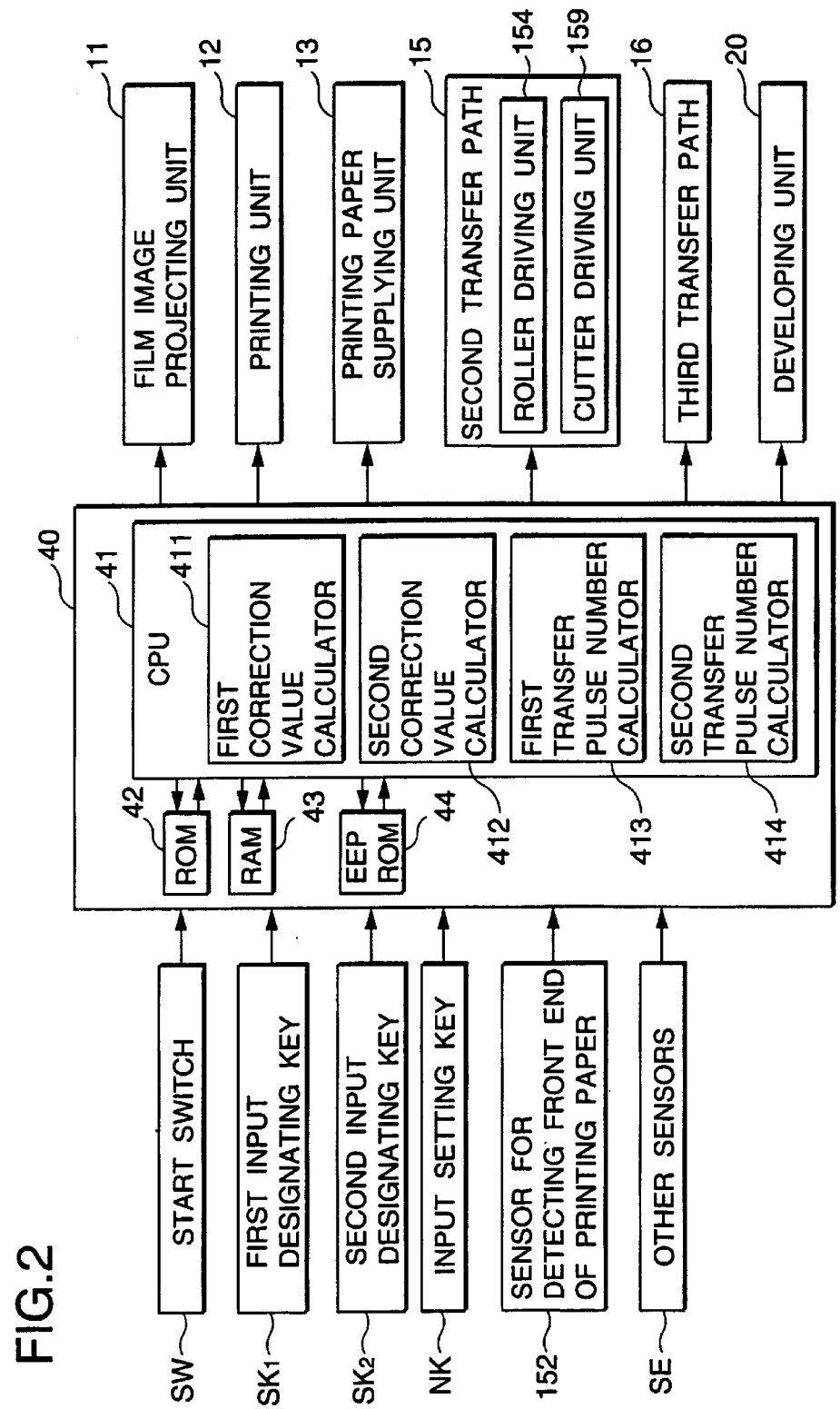
FIG. 2 is a block diagram showing a control configuration of the photoprinting machine.

FIG. 2 is a block diagram showing a main control configuration of the photoprinting machine. A control unit 40 comprises a CPU 41 which performs predetermined computing processes, a ROM 42 which stores predetermined programs, RAMs 43 which temporarily store process data, and EEPROMs 44 which store correction values for correcting a transfer error, and controls the operations of the whole of the photoprinting machine in accordance with the predetermined programs. The CPU 41 has functions of first correction value calculator 411, second correction value calculator 41.2, first transfer pulse number calculator 413, and second transfer pulse number calculator 414 which will be described later.

Specifically, the CPU 41 receives signals from the start switch SW, the first and second input designating keys $SK_1$ and $SK_2$, the setting keys NK, the sensor 152 for detecting the front end of printing paper, and other various sensors SE, and, in response to these signals, controls the negative carrier 111, the shutter 113, and the optical lens system 114 of the film image projecting unit 11; the driving roller 121 of the printing unit 12; the first and second feed rollers 131 and 132 of the printing paper supplying unit 13; the roller driving unit 154 of the transfer roller 151, and the cutter driving unit 159 of the cutter 153 in the second transfer path 15; the transfer rollers 161 of the third transfer path 16; the transferor 202 of the developing unit 20; etc.

The thus configured photoprinting machine generally operates in the following manner. When the start switch SW is turned ON, a negative film is transferred in the unit of one frame by the negative carrier 111 of the film image projecting unit 11, and film images are sequentially projected onto the printing unit 12.

Roll-like printing paper is gradually drawn out from the magazine $MG_1$ (or $MG_2$) of the printing paper supplying unit 13, and then cut into a predetermined length by the cutter 153 so as to be formed as cut sheets. The cut sheets are sequentially transferred onto the printing unit 12. The operation of cutting the printing paper is performed in the following manner. First, after the front end of the roll-like printing paper drawn out from the magazine $MG_1$ (or $MG_2$) reaches the sensor 152, the printing paper is transferred by a predetermined transfer pulse number from the position of the sensor 152 to the position of the cutter 153, and then by a predetermined range from the position of the cutter 153 by a predetermined transfer pulse number. Thereafter, the printing paper is cut by the cutter 153 into a cut sheet. The transfer of the cut sheet onto the printing unit 12 is performed in synchronization with the transfer of each frame of the negative film in the film image projecting unit 11.

The printing paper which is transferred to the printing unit 12 is subjected to a printing process by projecting an image from the film image projecting unit 11, and transferred to the downstream side by the transfer belt 123, and then to the developing unit 20 by the third transfer path 16. The printing paper which is transferred to the developing unit 20 is sent into the process tanks 201 so as to be subjected to a developing process. The printing paper which has undergone the developing process is transferred into the drying chamber 203 to be dried. The printing paper which has undergone the drying process is discharged to the printing paper discharging unit 204.

Figure 3:
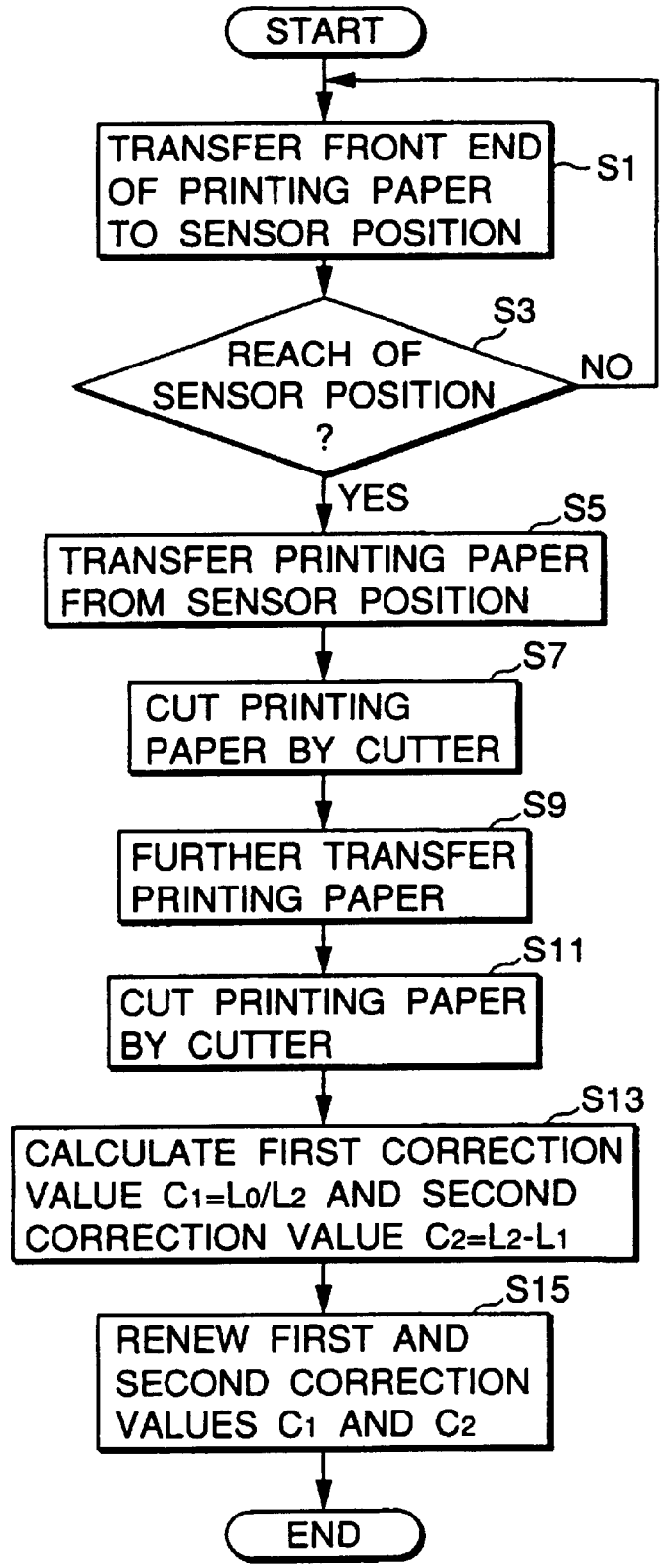
FIG. 3 is a flowchart illustrating an operation of renewing a correction value.
Figure 4:
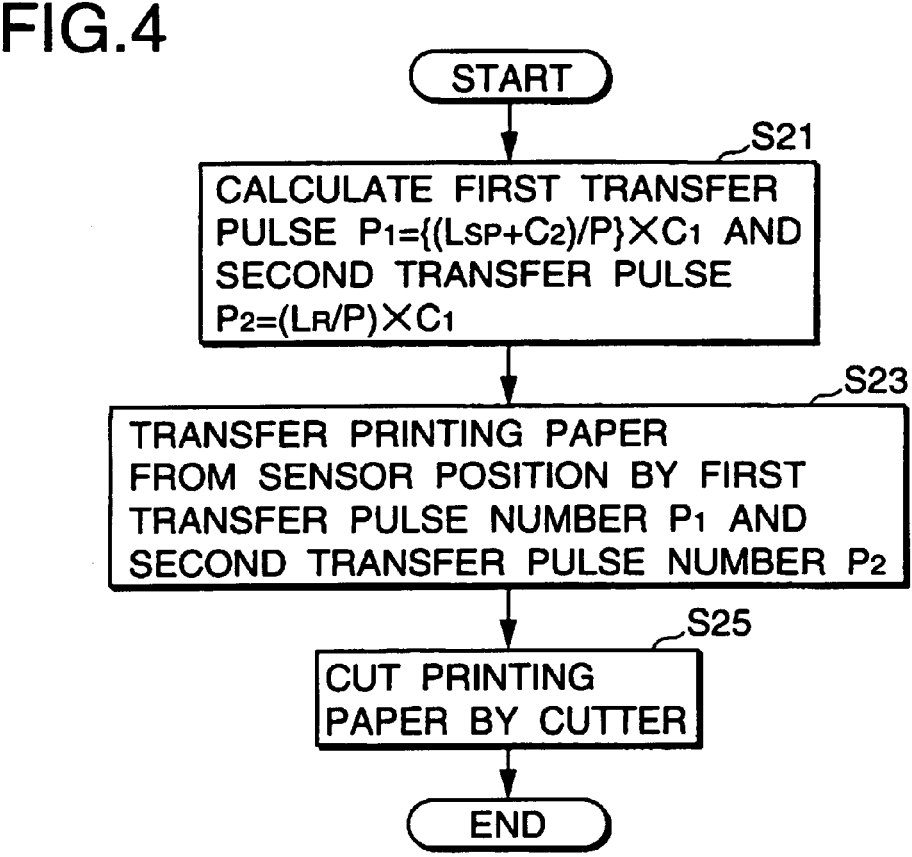
FIG. 4 is a flowchart illustrating an operation of correcting a transfer error on the basis of renewed correction values.

A correction operation for correcting a distance error in the transfer direction of a cut sheet will be described with reference to flowcharts of FIGS. 3 and 4. Such a distance error occurs when the transfer roller 151 of the second transfer path 15 is replaced with another one, or when the sensor 152 or the cutter 153 is replaced with another one. FIG. 3 is a flowchart illustrating an operation of renewing the correction value for correcting a distance error of a cut sheet, and FIG. 4 is a flowchart illustrating an operation of correcting the transfer range of printing paper on the basis of the renewed correction values.

Referring to FIG. 3, when a given setting key NK is pressed to instruct the apparatus to perform the correction operation, the printing paper is rewound so that the front end of the printing paper is located in upstream from the sensor 152. The first correction value for correcting an error in transfer from the position of the cutter 153 (i.e., the correction value for correcting a transfer error which is caused by variation of the diameter of the transfer roller 151), and the second correction value for correcting an error in transfer from the position of the sensor 152 to that of the cutter 153 (i.e., the correction value for correcting a transfer error which is caused by variation of the mounting distance between the sensor 152 and the cutter 153) are initialized. Thereafter, the printing paper is transferred toward the sensor 152 by the transfer roller 151 (step S1). It is then judged whether the front end of the printing paper reaches the position of the sensor 152 or not (step S3). If the front end of the printing paper reaches the position of the sensor 152 (YES in step S3), the printing paper is transferred from the position of the sensor 152 by a sequence of a transfer pulse number corresponding to a specified distance between the sensor 152 and the cutter 153, and a transfer pulse number corresponding to a reference transfer range from the position of the cutter 153 (step S5).

The specified distance between the sensor 152 and the cutter 153 is not a measured distance but a distance specified in the design of the machine. The reference transfer range from the position of the cutter 153 corresponds to a reference distance (for example, 2,000 mm) in the transfer direction of a cut sheet which is obtained for correcting a transfer error. The transfer pulse numbers are values which are respectively obtained by dividing the specified distance between the sensor 152 and the cutter 153, and the reference transfer range from the position of the cutter 153 (i.e., the reference distance of a cut sheet) by a pitch specified in the design of the machine which equals to a transfer distance produced by one pulse (hereinafter, referred to as a specified transfer pitch per pulse).

Next, the printing paper transferred in step S5 is cut by the cutter 153 so that a first cut sheet is formed (step S7). Thereafter, the printing paper is transferred from the position of the cutter 153 by the transfer pulse number corresponding to the reference transfer range (step S9), and then cut by the cutter 153 so that a second cut sheet is formed (step S11). The transfer pulse number also is a value which is obtained by dividing the reference transfer range by the specified pitch in the same manner as described above.

The distances in the transfer direction of the first and second cut sheets are measured. The obtained values (measured values) are respectively stored in RAMs 43 of the control unit 40 (the embodiment has plural RAMs 43). Specifically, with respect to the first cut sheet, the measured value is stored in one of the RAMs 43 (first storage portion) by pressing the first input designating key $SK_1$ of the control panel 30 and then inputting the measured value through the setting keys NK, and, with respect to the second cut sheet, the measured value is stored in another one of the RAMs 43 (second storage portion) by pressing the second input designating key $SK_2$ of the control panel 30 and then inputting the measured value through the setting keys NK. The first input designating key $SK_1$ and the setting keys NK form first inputting device, and the second input designating key $SK_2$ and the setting keys NK form second inputting device. Alternatively, the first and second storage portions may be configured by the same storage portion.

When a given setting key NK (instruction key) is then pressed, the first correction value (correction coefficient) $C_1$ for correcting the error in transfer from the position of the gutter 153, and the second correction value $C_2$ for correcting the error in transfer from the position of the sensor 152 to that of the cutter 153 are calculated (step S13). Specifically, in response to the depress of the instruction key, the measured length of the second cut sheet is read out from the RAM 43, and the first correction value $C_1$ is calculated by the first correction value calculator 411. On the other hand, the measured lengths of the first and second cut sheets are read out from the RAMs 43, respectively, and the second correction value $C_2$ is calculated by the second correction value calculator 412.

The first correction value $C_1$ is calculated from an equation of $L_0/L_2$ which is stored in the ROM 42, and the second correction value $C_2$ is calculated from an equation of $(L_2-L_1)$ which is stored in the ROM 42. In the equations, $L_0$ is the reference transfer range from the position of the cutter 153, $L_1$ is the measured length of the first cut sheet, and $L_2$ is the measured length of the second cut sheet. The reference transfer range $L_0$ (as described above, for example, 2,000 mm) is previously stored in the ROM 42, and read out therefrom at the same time when the measured length of the cut sheet is read out from the RAM 43. The calculated first and second correction values $C_1$ and $C_2$ are displayed on a display device (not shown) which is disposed in the control panel 30.

When the given setting key NK (instruction key) is then pressed, the first correction value $C_1$ is stored in one of the EEPROMs 44 (third storage portion) (the embodiment has plural EEPROMs 44), and the second correction value $C_2$ is stored in another one of the EEPROMs 44 (fourth storage portion), thereby renewing the correction values (step S15). Alternatively, the third and fourth storage portions may be configured by the same storage portion.

When the first and second correction values $C_1$ and $C_2$ are renewed as described above, the printing paper is correctly cut into the predetermined length in the next step of the printing process of the photoprinting machine while the transfer error is corrected, and then transferred to the printing unit 12. Specifically, referring to FIG. 4, a first transfer pulse number $P_1$ required for transferring the printing paper from the position of the sensor 152 to the position of the cutter 153 is calculated by the first transfer pulse number calculator 413 by using the first and second correction values $C_1$ and $C_2$, and a second transfer pulse number $P_2$ required for transferring the printing paper by a predetermined range from the position of the cutter 153 is calculated by the second transfer pulse number calculator 414 by using the first correction value $C_1$ (step S21).

The first transfer pulse number $P_1$ is calculated from an equation of $\{(L_{SP}+C_2)/P\} \times C_1$ which is stored in the ROM 42, and the second transfer pulse number $P_2$ is calculated from an equation of $(L_R/P) \times C_1$ which is stored in the ROM 42. In the equations, $L_{SP}$ is the specified distance between the sensor 152 and the cutter 153, P is the specified transfer pitch per pulse, $C_1$ is the first correction value, $C_2$ is the second correction value, and $L_R$ is the distance of a required cut sheet. The values of $L_{SP}$ and P are previously stored in the ROM 42. When the first and second transfer pulse numbers $P_1$ and $P_2$ are to be calculated, the first and second correction values $C_1$ and $C_2$ are read out from the EEPROMs 44, and $L_{SP}$ and P are read out from the ROM 42.

Next, the printing paper is transferred to the downstream slide from the position of the sensor 152 by a sequence of the first transfer pulse number $P_1$ and the second transfer pulse number $P_2$ (step S23), and then cut by the cutter 153 (step S25). As a result, a transfer error occurring when the transfer roller 151 of the second transfer path 15 is replaced with another one, or when the sensor 152 or the cutter 153 is replaced with another one is corrected and a cut sheet of a required distance is obtained.

When plural cut sheets are to be continuously obtained, the second transfer pulse number required for transferring the printing paper by the predetermined range from the position of the cutter 153 is calculated at each transfer by the second transfer pulse number calculator 414 by using the first correction value $C_1$. The printing paper is transferred to the downstream side by the respective second transfer pulse numbers, and sequentially cut by the cutter 153. It is a matter of course that the calculated first and second transfer pulse numbers may be previously stored in the EEPROMs 44 and the like and the pulse numbers may be read out at each transfer of the printing paper from the EEPROMs 44 and the like.

The first and second correction values are calculated by using the measured length of the second cut sheet, and the error in transfer from the position of the sensor 152 to that of the cutter 153, and the error in transfer from the position of the cutter 153 are corrected by using the first and second correction values. Therefore, a loss of the printing paper in correction of a transfer error can be suppressed as much as possible. Furthermore, unlike the prior art, it is not required to obtain a third cut sheet after the printing paper is rewound so that the front end of the printing paper is located in upstream from the sensor 152. Therefore, the working efficiency for the correction can be effectively enhanced.

In the embodiment, the measured lengths of the first and second cut sheets are stored in the internal storage portion, the measured lengths are read out from the storage portion, and the first and second correction values $C_1$ and $C_2$ are internally calculated. Alternatively, the measured lengths of the cut sheets may not be stored in the internal storage portion, the first and second correction values $C_1$ and $C_2$ may be calculated by an external electronic calculator or the like by using the measured lengths of the cut sheets, and the first and second correction values $C_1$ and $C_2$ which are externally calculated may be input to the control unit 40 of the photoprinting machine so as to be stored in the EEPROMs 44 and the like.

In the embodiment, the first correction value $C_1$ is calculated from the equation of $L_0/L_2$. Alternatively, the first correction value may be calculated from an equation of $L_2/L_0$. In the alternative, the first transfer pulse number is calculated from an equation of $\{(L_{SP}+C_2)/P\} \times (1/C_1)$, and the second transfer pulse number is calculated from an equation of $(L_R/P) \times (1/C_1)$.

In the embodiment, the first and second correction values $C_1$ and $C_2$ are renewed when the transfer roller 151, the sensor 152, the cutter 153, or the like is replaced with another one. The timing of the renewal is not restricted to the replacement of the transfer roller 151 or the like. For example, the first and second correction values $C_1$ and $C_2$ may be calculated when the thin material transfer apparatus is assembled or overhauled, and a transfer error may be corrected by using the calculated first and second correction values $C_1$ and $C_2$.

In the embodiment, the method is applied to a thin material transfer apparatus which transfers and cuts printing paper. The method may be applied to thin material transfer apparatuses for cutting thin materials other than printing paper, i.e., thin materials made of various kinds of material such as paper, a resin, and a metal. With respect to the contents of a process, furthermore, the process is not restricted to a cutting process using a cutter, and the method may be similarly applied to processes performed by various kinds of processing units, for example, formation of perforations in a thin material by a perforating apparatus, or formation of an image by an image forming apparatus. Therefore, a thin material which is cut into a predetermined length, that in which perforations are formed, or the like is called a processed thin material, and a cutter, a perforating apparatus, or the like is called a processing unit.

As described above, after the front end of the thin material transferred by the transfer roller is detected by the sensor, the thin material is transferred to the downstream side from a position of the sensor by a transfer pulse number corresponding to a specified distance between the sensor and the processing unit, and from a position of the processing unit by a transfer pulse number corresponding to a reference transfer range, and a predetermined process is then performed in the processing unit on the transferred thin material, thereby obtaining a first processed thin material. In succession, the thin material is transferred to the downstream side by a transfer pulse number corresponding to the reference transfer range, and the predetermined process is performed in the processing unit on the transferred thin material, thereby obtaining a second processed thin material. A first correction value for correcting a transfer error is calculated by using the reference transfer range and a measured length of the second processed thin material, and a second correction value for correcting a transfer error is calculated by using measured lengths of the first and second processed thin materials. Thereafter, the transfer of the thin material from the sensor position to the processing unit position, and the transfer of the thin material from the processing unit position are controlled based on the first and second correction values.

The first correction value is calculated from an equation of $L_0/L_2$, the second correction value is calculated from an equation of $(L_2-L_1)$, and a transfer range of the thin material from the sensor position to the processing unit position, and a transfer range of the thin material from the processing unit position are calculated by using the first and second correction values.

Further, a first transfer pulse number required for transferring the thin material from the sensor position to the processing unit position is calculated by using the first and second correction values, the specified distance, and a specified transfer pitch per pulse, a second transfer pulse number required for transferring the thin material by a predetermined range from the processing unit position is calculated by using the first correction value, the predetermined range, and the specified transfer pitch per pulse, and the thin material is transferred from the sensor position by the first transfer pulse number and the second transfer pulse number.

Further, the first transfer pulse number is calculated from an equation of $\{(L_{SP}+C_2)/P\} \times C_1$, the second transfer pulse number is calculated from an equation of $(L_R/P) \times C_1$, and the thin material is transferred by the first and second transfer pulse numbers.

The first correction value for correcting a transfer error is calculated by using a reference transfer range and a measured length of a second processed thin material, the second correction value for correcting a transfer error is calculated by using measured lengths of first and second processed thin materials, and the transfer of the thin material from a sensor position to a processing unit position, and that of the thin material from the processing unit position are corrected by using the calculated first and second correction values. Therefore, a loss of the thin material in correction of a transfer error can be suppressed as much as possible, and the working efficiency for the correction can be effectively enhanced.

Also, the thin material transfer apparatus is provided with: a first calculator for calculating a first transfer pulse number required for transferring a thin material from a sensor position to a processing unit position, by using a first and second correction values and the like, the first correction value being used for correcting an error in transfer from the processing unit position and calculated by using a measured length of a second processed thin material, the second correction value being used for correcting an error in transfer from the sensor position to the processing unit position and calculated by using measured lengths of first and second processed thin materials; a second calculator for calculating a second transfer pulse number required for transferring the thin material by a predetermined range from the processing unit position, by using the first correction value and the like; and a control unit for controlling a roller driving unit so as to transfer the thin material from the sensor position by a sequence of the first transfer pulse number and the second transfer pulse number. Therefore, it is possible to realize an apparatus in which a loss of the thin material in correction of a transfer error can be suppressed as much as possible, and the working efficiency for the correction can be effectively enhanced.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method of correcting transfer of a thin material transfer apparatus comprising a transfer roller which is rotated in accordance with a number of input transfer pulses; a sensor which detects a front end of a thin material transferred by the transfer roller; and a processing unit which is disposed downstream from the sensor, and performs a predetermined process on the transferred thin material, the method comprising the steps of:

detecting a front end of a thin material by the sensor, and transferring the thin material from a position of the sensor by a transfer pulse number corresponding to a specified distance between the sensor and the processing unit, and a transfer pulse number corresponding to a reference transfer range from a position of the processing unit;

performing the process in the processing unit on the transferred thin material, thereby obtaining a first processed thin material portion;

transferring the thin material by a transfer pulse number corresponding to the reference transfer range;

performing the process in the processing unit on the transferred thin material, thereby obtaining a second processed thin material portion;

calculating a first correction value for correcting a transfer error based on the reference transfer range and a measured length of the second processed thin material portion, and calculating a second correction value for correcting a transfer error based on measured lengths of the first and second processed thin material portions; and correcting the transfer from the sensor position to the processing unit position, and the transfer from the processing unit position based on the first and second correction values.

2. A method according to claim 1, wherein the step of correcting the transfer range of the thin material from the sensor position to the processing unit position, and the transfer range of the thin material from the processing unit position, includes the steps of:

calculating a first transfer pulse number required for transferring the thin material from the sensor position to the processing unit position based on the first and second correction values, the specified distance, and a specified transfer pitch per pulse, and calculating a second transfer pulse number required for transferring the thin material by a predetermined range from the processing unit position based on the first correction value, the predetermined range, and the specified transfer pitch per pulse; and transferring the thin material from the sensor position by a sequence of the first transfer pulse number and the second transfer pulse number.

3. A method according to claim 2, wherein the first transfer pulse number is calculated from an equation of $\{(L_{SP}+C_2)/P\} \times C_1$, and the second transfer pulse number is calculated from an equation of $(L_R/P) \times C_1$, wherein:

$L_{SP}$ is the specified distance between the sensor and the processing unit,

P is the specified transfer pitch per pulse, $C_1$ is the first correction value, $C_2$ is the second correction value, and $L_R$ is the predetermined range of the thin material transferred from the processing unit position.

4. A method according to claim 1, wherein the first correction value is calculated from an equation of $L_0/L_2$, and the second correction value is calculated from an equation of $(L_2-L_1)$, wherein:

$L_0$ is the reference transfer range, $L_1$ is the measured length of the first processed thin material portion, and $L_2$ is the measured length of the second processed thin material portion.

5. A method according to claim 4, wherein the step of correcting the transfer range of the thin material from the sensor position to the processing unit position, and the transfer range of the thin material from the processing unit position, includes the steps of:

calculating a first transfer pulse number required for transferring the thin material from the sensor position to the processing unit position based on the first and second correction values, the specified distance, and a specified transfer pitch per pulse, and calculating a second transfer pulse number required for transferring the thin material by a predetermined range from the processing unit position based on the first correction value, the predetermined range, and the specified transfer pitch per pulse; and transferring the thin material from the sensor position by a sequence of the first transfer pulse number and the second transfer pulse number.

6. A method according to claim 5, wherein the first transfer pulse number is calculated from an equation of $\{(L_{SP}+C_2)/P\} \times C_1$, and the second transfer pulse number is calculated from an equation of $(L_R/P) \times C_1$, wherein:

$L_{SP}$ is the specified distance between the sensor and the processing unit,

P is the specified transfer pitch per pulse, $C_1$ is the first correction value, $C_2$ is the second correction value, and $L_R$ is the predetermined range for the thin material transferred from the processing unit position.

7. A thin material transfer apparatus comprising:

a roller driving unit which rotates a transfer roller in accordance with a number of input transfer pulses;

a sensor which detects a front end of a thin material transferred by the transfer roller;

a processing unit which is disposed downstream from the sensor, and performs a predetermined process on the transferred thin material;

a first calculator which calculates a first transfer pulse number for transferring the thin material from a position of the sensor to a position of the processing unit position, the first transfer pulse number being calculated based on first and second correction values for correcting a transfer error, the first correction value being calculated based on a reference transfer range and a measured length of a second processed thin material portion, the second correction value being calculated based on measured lengths of the first and second processed thin materials portion, the reference transfer range being a predetermined range which the thin material is transferred from the position of the processing unit, the first processed thin material portion being produced by transferring the thin material from the position of the sensor by a transfer pulse number corresponding to a specified distance between the sensor and the processing unit after the sensor detects the front end of the thin material, and transferring from the position of the processing unit by a transfer pulse number corresponding to the reference transfer range, performing the process in the processing unit, the second processed thin material portion being produced by transferring the thin material by a transfer pulse number corresponding to the reference transfer range, performing the process in the processing unit on the transferred thin material;

a second calculator which calculates a second transfer pulse number for transferring the thin material from the processing unit position based on the first correction value; and a control unit which controls the roller driving unit to transfer the thin material from the sensor position by a sequence of the first transfer pulse number and the second transfer pulse number.

8. A thin material transfer apparatus according to claim 7, wherein the first correction value is calculated from an equation of $L_0/L_2$, the second correction value is calculated from an equation of $(L_2-L_1)$, the first transfer pulse number is calculated from an equation of $\{(L_{SP}+C_2)/P\} \times C_1$, and the second transfer pulse number is calculated from an equation of $(L_R/P) \times C_1$, wherein:

$L_0$ is the reference transfer range for the processed thin material, $L_2$ is the measured length of the second processed thin material portion, $L_1$ is the measured length of the first processed thin material portion, $L_{SP}$ is the specified distance between the sensor and the processing unit, P is a transfer pitch per pulse, $C_1$ is the first correction value, $C_2$ is the second correction value, and $L_R$ is a predetermined range for the thin material.

* * * * *